(12) United States Patent
Roth (10) Patent No.: US 10,508,841 B2
(45) Date of Patent: Dec. 17, 2019

(54) COOLING CIRCUIT FOR A VARIABLE FREQUENCY DRIVE

(71) Applicant: TRANE INTERNATIONAL INC., Davidson, NC (US)

(72) Inventor: Robert J. Roth, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 127 days.

(21) Appl. No.: 15/705,926

(22) Filed: Sep. 15, 2017

(65) Prior Publication Data

US 2018/0073787 A1 Mar. 15, 2018

Related U.S. Application Data

(60) Provisional application No. 62/395,095, filed on Sep. 15, 2016.

(51) Int. Cl.
| | |
|---|---|
| *F25B 31/00* | (2006.01) |
| *F25B 49/02* | (2006.01) |
| *F25B 5/00* | (2006.01) |
| *F25B 41/00* | (2006.01) |
| *F25B 1/04* | (2006.01) |
| *F25B 1/10* | (2006.01) |

(52) U.S. Cl.
CPC ............ *F25B 31/006* (2013.01); *F25B 5/00* (2013.01); *F25B 41/003* (2013.01); *F25B 49/02* (2013.01); *F25B 1/04* (2013.01); *F25B 1/10* (2013.01); *F25B 2600/021* (2013.01); *F25B 2600/2501* (2013.01); *F25B 2600/2519* (2013.01); *F25B 2700/21156* (2013.01); *Y02B 30/741* (2013.01)

(58) Field of Classification Search
CPC .......... F25B 31/006; F25B 31/02; F25B 5/00; F25B 2600/2501; F25B 2600/2519; F25B 2700/21153; F25B 2700/21154; F25B 2700/21156

See application file for complete search history.

(56) References Cited

U.S. PATENT DOCUMENTS

| | | | | |
|---|---|---|---|---|
| 6,116,040 A | * | 9/2000 | Stark ...................... | F04B 39/06 62/113 |
| 6,688,124 B1 | * | 2/2004 | Stark .................... | F25B 49/022 62/222 |

\* cited by examiner

*Primary Examiner* — Marc E Norman
(74) *Attorney, Agent, or Firm* — Hamre, Schumann, Mueller & Larson, P.C.

(57) ABSTRACT

Systems and methods for controlling a cooling circuit for a variable frequency drive (VFD) in an HVACR system are disclosed. The method includes determining, by a controller, an operating condition of a heat sink associated with the VFD. The controller determines whether a temperature of the heat sink is greater than or equal to a heat sink temperature threshold. The method further includes enabling a bypass flow control device in response to the heat sink temperature being greater than or equal to the heat sink temperature threshold.

16 Claims, 6 Drawing Sheets

COOLING CIRCUIT FOR A VARIABLE FREQUENCY DRIVE

FIELD

This disclosure relates generally to a heating, ventilation, air conditioning, and refrigeration (HVACR) system. More specifically, this disclosure relates to cooling a variable frequency drive for an HVACR system.

BACKGROUND

A heating, ventilation, air conditioning, and refrigeration (HVACR) system can include a compressor driven by an electric motor and a variable frequency drive (VFD). The VFD includes power electronics which can generate a significant amount of heat. The VFD may require cooling to prevent overheating, and subsequently failure, of the VFD and the HVACR system. Cooling of the VFD and associated power electronics can, for example, be accomplished by providing a portion of working fluid (e.g., heat transfer fluid such as refrigerant) in a heat exchange relationship with a heat sink of the VFD, such that the heat sink can reject heat to the working fluid.

SUMMARY

This disclosure relates generally to a heating, ventilation, air conditioning, and refrigeration (HVACR) system. More specifically, this disclosure relates to cooling a variable frequency drive (VFD) for an HVACR system. In an embodiment, the HVACR system can include a chiller system.

In an embodiment, a temperature of a working fluid in a condenser may be at or about 95° F. In an embodiment, a temperature of the working fluid in the condenser can be greater than 95° F. In an embodiment, the heat sink may have a selected temperature at which it is to be maintained. In an embodiment, this temperature can be at or about 95° F. In an embodiment, the temperature of the working fluid in the condenser may be such that the working fluid is unable to cool the heat sink to the selected temperature.

In an embodiment, the HVACR system can include a VFD cooling circuit. In an embodiment, the VFD cooling circuit can be fluidly connected to a condenser and fluidly connected to a location at which a working fluid in the HVACR system is at a relatively lower temperature than the condenser. In an embodiment, the location can be an evaporator, an economizer, or the like. In an embodiment, the fluid connection between the VFD cooling circuit and the relatively lower temperature location can be selectively enabled/disabled.

In an embodiment, the VFD cooling circuit can be fluidly connected to the evaporator in the HVACR system when a temperature of a heat sink for the VFD is greater than a threshold temperature. In an embodiment, the threshold temperature can be at or about 140° F. In an embodiment, the temperature utilized can be a temperature of the VFD instead of, or in addition to, the temperature of the heat sink.

In an embodiment, the VFD cooling circuit can be fluidly connected to the condenser and an economizer heat exchanger in the HVACR system. In an embodiment, the fluid connection between the VFD cooling circuit and the economizer heat exchanger can be selectively enabled/disabled. For example, in an embodiment, fluid flow between the VFD cooling circuit and the economizer heat exchanger can be enabled when a temperature of the heat sink for the VFD and/or the VFD itself is greater than a threshold temperature. The fluid flow can be enabled by, for example, placing a flow control device in a flow enabled state.

In an embodiment, the threshold temperature selected may be a maximum temperature of the heat sink and/or the VFD and can, for example, depend upon the HVACR system. In an embodiment, the threshold temperature can be from at or about 80° F. to at or about 180° F. It will be appreciated that this range is an example, and that the threshold temperature can vary beyond the stated range according to the principles described in this specification.

In an embodiment, the VFD cooling circuit can be provided for the HVACR system at a time of manufacturing and/or installation of the HVACR system. In an embodiment, the VFD cooling circuit can be provided for the HVACR system after manufacturing and/or installation of the HVACR system. That is, the VFD cooling circuit can be retrofit into an HVACR system which has been installed and/or in use.

In an embodiment, the VFD cooling circuit can prevent the VFD from reaching a temperature that is below an ambient dew point temperature. For example, if the temperature approaches the ambient dew point temperature, the VFD cooling circuit can, for example, disable fluid flow of the working fluid from the condenser to disable the heat exchange relationship between the working fluid and the heat sink. In an embodiment, an alarm, or other alert, can be triggered when the temperature approaches the ambient dew point temperature. This can, for example, prevent condensation from forming on the VFD which could, for example, cause a catastrophic failure of the electronics for the VFD.

A cooling circuit for a variable frequency drive (VFD) in an HVACR system is described. The HVACR system includes a condenser, an evaporator, an expansion device, and a compressor fluidly connected, the cooling circuit having a working fluid, the compressor being driven by the VFD. The cooling circuit includes a pump fluidly connected to the condenser and configured to receive the working fluid in liquid form from the condenser; a bypass flow control device fluidly connected to the pump, the heat sink, and a location in the HVACR system at which the working fluid is at a relatively lower temperature than a temperature of the working fluid in liquid form in the condenser, and the condenser. The cooling circuit further includes a heat sink in a heat exchange relationship with the VFD such that the VFD rejects heat to the working fluid when the HVACR system is in operation; a sensor and a controller, the controller determining a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled. The cooling circuit further includes a flow control device disposed between the condenser and the component that prevents flow of working fluid from the condenser to the location.

An HVACR system is disclosed. The HVACR system includes a variable frequency drive (VFD); a condenser, an evaporator, an expansion device, and a compressor fluidly connected, the compressor being driven by the VFD; and a cooling circuit that cools the VFD. The cooling circuit includes a pump fluidly connected to the condenser and configured to receive a working fluid in liquid form from the condenser; a bypass flow control device fluidly connected to the pump, the heat sink, and a location in the HVACR system at which the working fluid is at a relatively lower temperature than a temperature of working fluid in liquid form in the condenser, and the condenser. The cooling circuit further includes a heat sink in a heat exchange relationship with the VFD such that the VFD rejects heat to the working fluid when the HVACR system is in operation; a sensor and a controller, the controller determining a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled. The cooling circuit further includes a flow control device disposed between the condenser and the component that prevents flow of working fluid from the condenser to the location.

An HVACR system is disclosed. The HVACR system includes a variable frequency drive (VFD), a condenser, an evaporator, an economizer heat exchanger, an expansion device, and a compressor fluidly connected, the compressor being driven by the VFD. The HVACR system further includes a cooling circuit that cools the VFD. The cooling circuit includes a pump fluidly connected to the condenser and configured to receive a working fluid in liquid form from the condenser; a bypass flow control device fluidly connected to the pump, the heat sink, and a location in the HVACR system at which the working fluid is at a relatively lower temperature than a temperature of the working fluid in liquid form in the condenser, and the condenser. The cooling circuit further includes a heat sink in a heat exchange relationship with the VFD such that the VFD rejects heat to the working fluid when the HVACR system is in operation; a sensor and a controller, the controller determining a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled. The cooling circuit further includes a flow control device disposed between the condenser and the component that prevents flow of working fluid from the condenser to the location.

A method for controlling a cooling circuit for a variable frequency drive (VFD) in an HVACR system is disclosed. The method includes determining, by a controller, an operating condition of a heat sink associated with the VFD; determining, by the controller, whether the operating condition is representative of a problem condition; and enabling a bypass flow control device in response to identifying the problem condition.

A method for retrofitting a cooling circuit into an HVACR system having a variable frequency drive (VFD) and a heat sink associated therewith is disclosed. The HVACR system includes a compressor, a condenser, an evaporator, an economizer heat exchanger, and an expansion device fluidly connected. The method includes fluidly connecting the condenser with a pump, the heat sink, and a location in the HVACR system at which the working fluid is at a relatively lower temperature than a working fluid in liquid form in the condenser; and disposing the cooling circuit in a heat exchange relationship with the heat sink.

A cooling circuit for a variable frequency drive (VFD) in an HVACR system is described. The HVACR system includes a condenser, an evaporator, an expansion device, and a compressor fluidly connected, the cooling circuit having a working fluid, the compressor being driven by the VFD. The cooling circuit includes a pump fluidly connected to the condenser and configured to receive the working fluid in liquid form from the condenser; a bypass flow control device fluidly connected to the pump, the heat sink, the evaporator, and the condenser; a heat sink in a heat exchange relationship with the VFD such that the VFD rejects heat to the working fluid in the cooling circuit when the HVACR system is in operation; a sensor and a controller, the controller determining a value representative of an operating condition from the sensor and selectively enables and/or disables the bypass flow control device such that the evaporator fluidly communicates with the heat sink when the bypass flow control device is enabled, and fluid communication between the heat sink and the evaporator is prevented when the bypass flow control device is disabled; and a flow control device disposed between the condenser and the evaporator that prevents flow of working fluid from the condenser to the evaporator.

A cooling circuit for a variable frequency drive (VFD) in an HVACR system is described. The HVACR system includes a condenser, an evaporator, an expansion device, an economizer heat exchanger, and a compressor fluidly connected, the cooling circuit having a working fluid, the compressor being driven by the VFD. The cooling circuit includes a pump fluidly connected to the condenser and configured to receive a working fluid in liquid form from the condenser; a bypass flow control device fluidly connected to the pump, the heat sink, the economizer heat exchanger, and the condenser; a heat sink in a heat exchange relationship with the VFD such that the VFD rejects heat to the working fluid in the cooling circuit when the HVACR system is in operation; a sensor and a controller, the controller determining a value representative of an operating condition from the sensor and selectively enables and/or disables the bypass flow control device such that the economizer heat exchanger fluidly communicates with the heat sink when the bypass flow control device is enabled, and fluid communication between the heat sink and the economizer heat exchanger is prevented when the bypass flow control device is disabled; and a flow control device disposed between the condenser and the economizer heat exchanger that prevents flow of working fluid from the condenser to the economizer heat exchanger.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This disclosure relates generally to a heating, ventilation, air conditioning, and refrigeration (HVACR) system. More specifically, this disclosure relates to cooling a variable frequency drive for an HVACR system.

An HVACR system can include an electric motor and a variable frequency drive (VFD) for powering a compressor in the HVACR system. The VFD and its associated electrical components can generate a significant amount of heat. To function properly, the electronics require cooling. If the VFD is not sufficiently cooled, the VFD can overheat and fail. In some cases, the VFD can be cooled using a working fluid (e.g., a heat transfer fluid such as, but not limited to, refrigerant) of the HVACR system. For example, a pump can be included in the HVACR system that draws a working fluid in liquid form from a condenser of the HVACR system and provides the working fluid in a heat transfer relationship to a heat sink of the VFD. In some environments, however, the working fluid from the condenser may be at a temperature which is too high to provide cooling for the VFD. For example, in hot climates (e.g., desert climates, etc.) the working fluid from the condenser may be too high to provide cooling for the VFD. In an embodiment, an HVACR system that is designed for heat recovery may also face this issue. Embodiments in this specification are directed to an HVACR system which uses the working fluid for cooling, and includes a control which can enable cooling of the VFD even in a scenario in which the temperature of the working fluid from the condenser is too high. In an embodiment, the HVACR system can be a chiller system. In another embodiment, the HVACR system can include a refrigeration system other than a chiller system that includes a compressor powered by an electric motor and a VFD.

Figure 1:
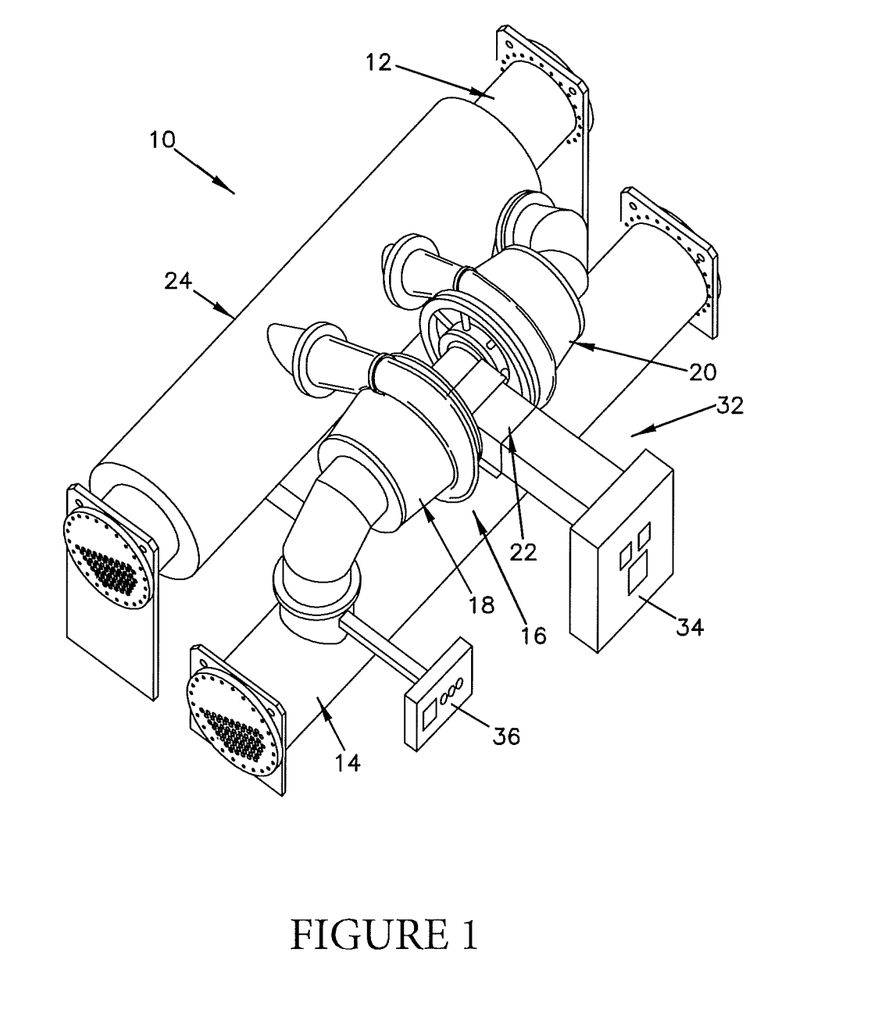
FIG. 1 is a perspective view of an HVACR system for implementing systems and methods described in this specification, according to an embodiment.

FIG. 1 is a perspective view of a HVACR system 10 which can be implemented as a chiller or include a chiller for implementing systems and methods described in this specification, according to an embodiment. The HVACR system 10 may include one or more additional features which are not illustrated for simplicity of the drawings.

The illustrated HVACR system 10 includes a condenser 12, an evaporator 14, a multi-stage compressor 16 having a first stage compressor 18 and a second stage compressor 20 that can be driven by any suitable electric motor 22. It will be appreciated that the compressor 16 can be a single stage compressor, according to an embodiment. The HVACR system 10 can also include an economizer 24, which may be coaxial with the condenser 12. It will be appreciated that the HVACR system 10 can include one or more additional features such as, but not limited to, one or more flow control devices, a lubricant separator, a heat sink, a pump, or the like.

The compressor 16 can be driven by electric motor 22. A variable speed drive (VSD) system 32 includes the electric motor 22. The electric motor 22 may be located, for example, between the first stage compressor 18, the second stage compressor 20, and a VSD 34 including power electronics. The VSD 34 may alternatively be referred to as the variable frequency drive (VFD) 34. The electric motor 22 can include a direct drive, variable speed, hermetic motor, according to an embodiment. A speed of the electric motor 22 can be controlled by varying a frequency of the electric power that is supplied to the electric motor 22 by the VFD 34. The VFD 34 can include, for example, an electrical power converter including a line rectifier and line electrical current harmonic reducer, power circuits, and control circuits (such circuits including all communication and control logic, including electronic power switching circuits). The VFD 34 can respond, for example, to signals received from a microprocessor integrated within a control panel 36 to increase and/or decrease the speed of the electric motor 22 by changing the frequency of the current supplied to the electric motor 22. The speed of the electric motor 22 can be varied, for example, to meet changing system requirements.

According to an embodiment, operation of the first and second stage compressors 18, 20, and the HVACR system 10, can be controlled by, for example, the control panel 36 in connection with sensors located within the HVACR system 10 that allow for the reliable operation of the HVACR system 10. Other controls may be linked to the control panel 36, such as, but not limited to, compressor controls; system supervisory controls that can be coupled with other controls to improve efficiency; soft motor starter controls; controls for regulating guide vanes and/or controls to avoid system fluid surge; control circuitry for the electric motor 22 and/or VFD 34; and other sensors/controls are contemplated as should be understood. It should be apparent that software may be provided in connection with operation of the VFD 34 and other components of the HVACR system 10, for example.

Figure 2A:
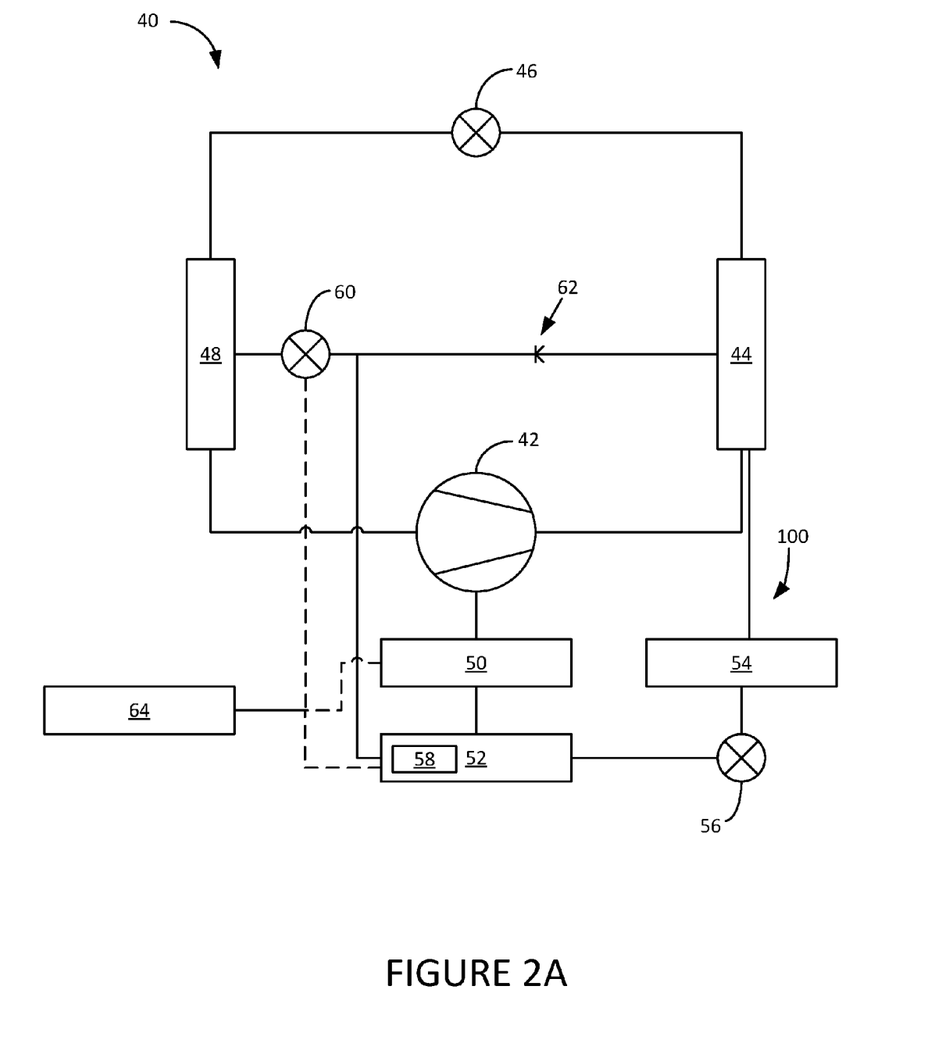
FIGS. 2A-2D are schematic diagrams of a heat transfer circuit for an HVACR system, according to an embodiment.
Figure 2B:
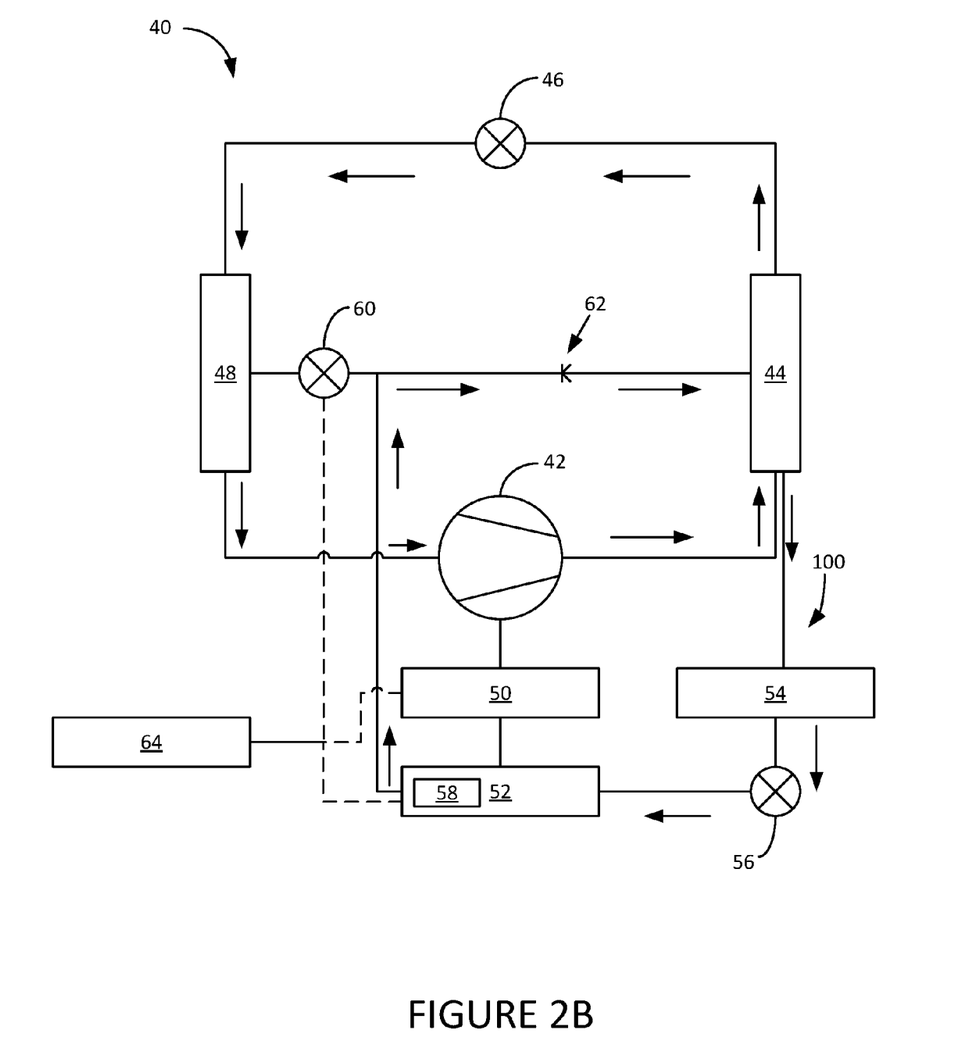
Figure 2C:
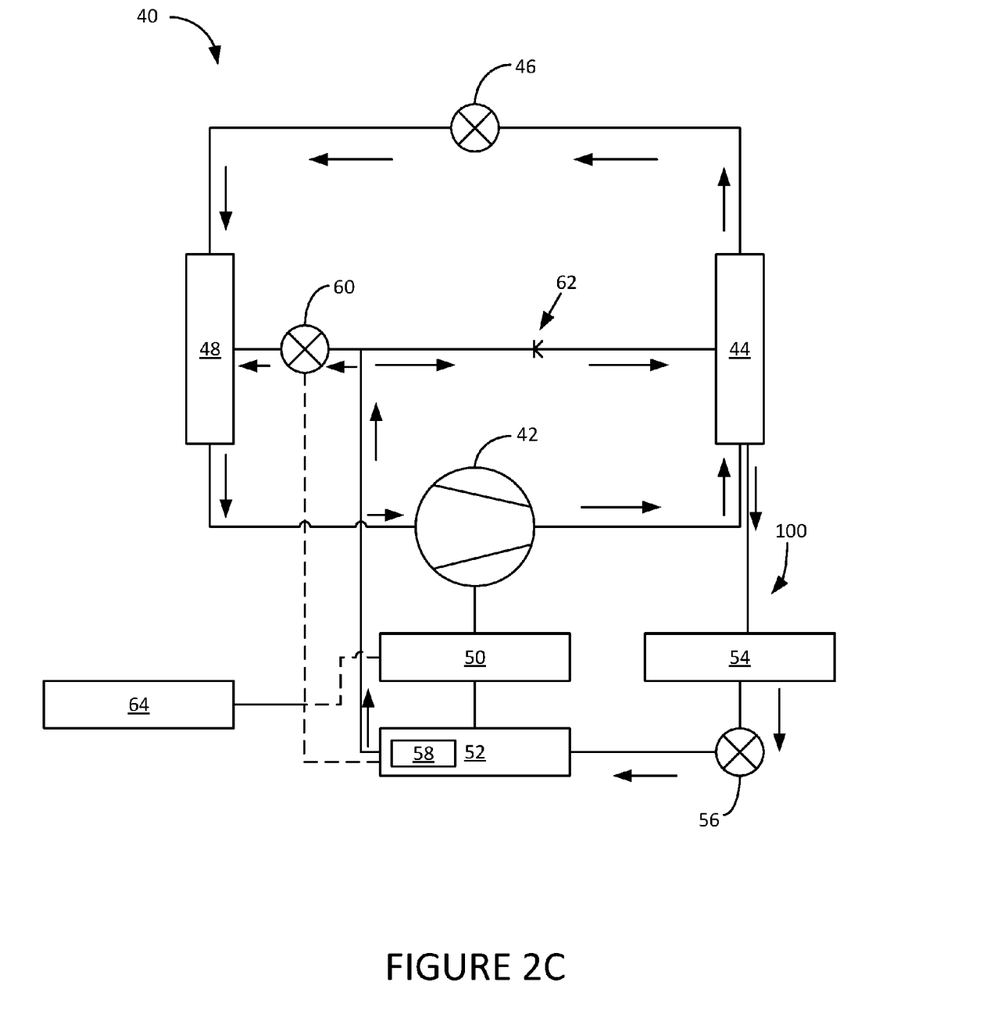
Figure 2D:
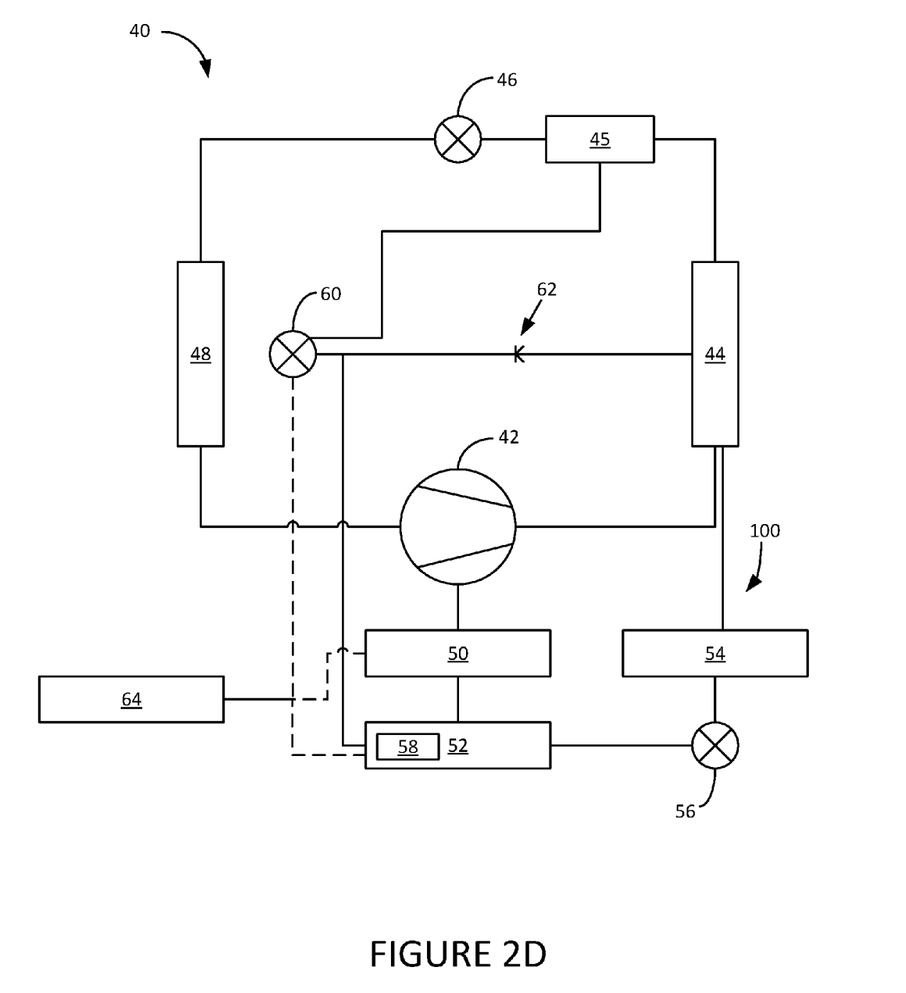

FIGS. 2A-2D are schematic diagrams of a refrigerant circuit for an HVACR system 40, according to an embodiment. Aspects of FIGS. 2A-2D may be the same as or similar to aspects of FIG. 1. FIG. 2A shows the HVACR system 40, according to an embodiment. FIG. 2B shows arrows representing a direction of fluid flow of a working fluid in the HVACR system 40 when the HVACR system 40 is operating in a first mode, according to an embodiment. FIG. 2C shows arrows representing a direction of fluid flow of a working fluid in the HVACR system 40 when the HVACR system 40 is operating in a second mode, according to an embodiment. FIG. 2D shows the HVACR system 40, according to an embodiment in which the HVACR system 40 includes an economizer heat exchanger 45.

In an embodiment, the HVACR system 40 can alternatively be referred to as the refrigerant system 40 or the like. The HVACR system 40 generally includes a compressor 42, a condenser 44, an expansion device 46, and an evaporator 48. The compressor 42 can be, for example, a centrifugal compressor, a screw compressor, a scroll compressor, or the like. The compressor 42 can be a single stage compressor or a multiple-stage compressor. In an embodiment, the compressor 42 can be a multi-stage compressor, similar to the multi-stage compressor 16 described in FIG. 1. The HVACR system 40 is an example and can be modified to include additional components. For example, in an embodiment, the HVACR system 40 can include other components such as, but not limited to, one or more flow control devices, a receiver tank, a dryer, a suction-liquid heat exchanger, or the like.

The HVACR system 40 can generally be applied to control an environmental condition (e.g., temperature, humidity, air quality, or the like) in a space (generally referred to as a conditioned space).

The compressor 42, condenser 44, expansion device 46, and evaporator 48 are fluidly connected. In an embodiment, the HVACR system 40 can be configured to be a cooling system (e.g., an air conditioning system) capable of operating in a cooling mode. In an embodiment, the HVACR system 40 can be configured to be a heat pump system that can operate in both a cooling mode and a heating/defrost mode.

The HVACR system 40 can operate according to generally known principles. The HVACR system 40 can heat or cool a liquid process fluid (e.g., a heat transfer fluid or medium (e.g., a liquid such as, but not limited to, water, glycol, or the like)).

In operation, the compressor 42 compresses a working fluid (e.g., a heat transfer fluid (e.g., refrigerant or the like))

from a relatively lower pressure gas to a relatively higher-pressure gas. The relatively higher-pressure gas is also at a relatively higher temperature, which is discharged from the compressor 42 and flows through the condenser 44. In accordance with generally known principles, the working fluid flows through the condenser 40 and rejects heat to the process fluid (e.g., water, air, etc.), thereby cooling the working fluid. The cooled working fluid, which is now in a liquid form, flows to the expansion device 46. As discussed in further detail below, a portion of the cooled working fluid can be utilized to cool a heat sink 52.

The expansion device 46 reduces the pressure of the working fluid. As a result, a portion of the working fluid is converted to a gaseous form. The working fluid, which is now in a mixed liquid and gaseous form flows to the evaporator 48. The working fluid flows through the evaporator 48 and absorbs heat from the process fluid (e.g., a heat transfer medium (e.g., water, air, etc.)), heating the working fluid, and converting it to a gaseous form. The gaseous working fluid then returns to the compressor 42. The above-described process continues while the heat transfer circuit is operating, for example, in a cooling mode (e.g., while the compressor 42 is enabled).

The compressor 42 is driven by variable speed drive (VSD) 50. The VSD 50 may alternatively be referred to as the variable frequency drive (VFD) 50. The VFD 50 can function similarly to the VFD 34 described in accordance with FIG. 1 above. In general, the VFD 50 and corresponding power electronics require cooling to function properly. To provide this cooling, a variable frequency drive cooling circuit 100 may be included in the HVACR system 40. The HVACR system 40 may also include a controller 64 for controlling one or more operations of the HVACR system 40.

The variable frequency drive cooling circuit 100 generally can divert a portion of the working fluid from the condenser 44 to a heat exchange relationship with a heat sink 52 of the VFD 50. The variable frequency drive cooling circuit 100 generally includes a pump 54, a flow control device 56, a sensor 58, a bypass flow control device 60, and a flow control device 62. In an embodiment, the flow control device 56 may be optional. It will be appreciated that a location of the sensor 58 may be varied. The location of the sensor 58 may be selected such that values from the sensor 58 can be used to identify a problem condition in which the VFD 50 may be operating, for example, at a temperature that is higher than a threshold.

The pump 54 can be fluidly connected to the condenser 44. The connection between the pump 54 and the condenser 44 can be provided at a location in which the working fluid in the condenser 44 is in a liquid form such that the pump 54 can pull a portion of the working fluid in liquid form from the condenser 44. The pump 54 can be enabled (e.g., powered on) to draw a portion of the working fluid in liquid form from the condenser 44, and provide the working fluid in liquid form in a heat exchange relationship to the heat sink 52 (see FIGS. 2B-2C for arrows representing direction of the working fluid flow). The working fluid in liquid form can absorb heat from the heat sink 52, converting at least a portion of the working fluid in liquid form to a gaseous form. In an embodiment, the working fluid may be in a gaseous form following the heat exchange with the heat sink 52. In an embodiment, the working fluid may be in a mixed liquid and gaseous form following the heat exchange with the heat sink 52. The working fluid in either the mixed liquid and gaseous form or in the gaseous form can be returned to the condenser 44.

In an embodiment, the heat sink 52 includes the sensor 58. The sensor 58 is electrically connected to the controller 64. The sensor 58 can be, for example, a temperature sensor. In an embodiment, the sensor 58 can alternatively be a pressure sensor or the like. When the sensor 58 is a temperature sensor and senses a temperature that is outside a threshold temperature, a bypass flow control device 60 may be enabled. The bypass flow control device 60 may enable a flow path of working fluid between a relatively colder location, such as the evaporator 48, and the heat sink 52 (see FIG. 2C). When the bypass flow control device 60 is enabled, flow of the working fluid in a mixed liquid and gaseous form or a gaseous form from the heat sink 52 may be fluidly connected to the colder location, such as the evaporator 48. In an embodiment, the colder location can be a location other than the evaporator 48 such as, but not limited to, an economizer heat exchanger 45, or the like (see FIG. 2D). In an embodiment, enabling flow through the bypass flow control device 60 to the relatively colder location can, for example, reduce a pressure of the working fluid in the heat exchange relationship with the heat sink 52. Reducing the pressure of the working fluid in the heat exchange relationship with the heat sink 52 can, for example, allow for additional conversion of the working fluid in liquid form to a gaseous working fluid. In an embodiment, reducing the pressure of the working fluid can, for example, enable greater absorption of heat from the heat sink 52, allowing the heat sink 52 to be cooled to a lower temperature.

The condenser 44 generally includes working fluid that is at a relatively higher pressure than the working fluid in the relatively colder location (e.g., the evaporator 48). A flow control device 62 can be included to, for example, prevent working fluid from flowing from the relatively higher pressure at the condenser 44 toward the relatively lower pressure at the relatively colder location (e.g., evaporator 48).

The flow control device 56 can, for example, induce a pressure drop for the liquid form of the working fluid being provided in the heat exchange relationship with the heat sink 52. The pressure drop may, for example, be used to control a flowrate of the working fluid across the heat sink 52. For example, the flowrate of the working fluid can be selected such that a portion of the working fluid is still in the liquid form as a downstream end of the heat sink 52 is reached. This can, for example, improve a cooling of the heat sink 52 across an entire length of the heat sink 52. In an embodiment, this can ensure that a downstream portion (e.g., an evaporator side) of the heat sink 52 is not at a relatively higher temperature than an upstream portion (e.g., a condenser side) of the heat sink 52. In an embodiment, the flow control device 56 may be unnecessary depending upon a flowrate of the working fluid as determined by a pressure differential between the upstream portion of the heat sink 52 and the downstream portion of the heat sink 52.

Figure 3:
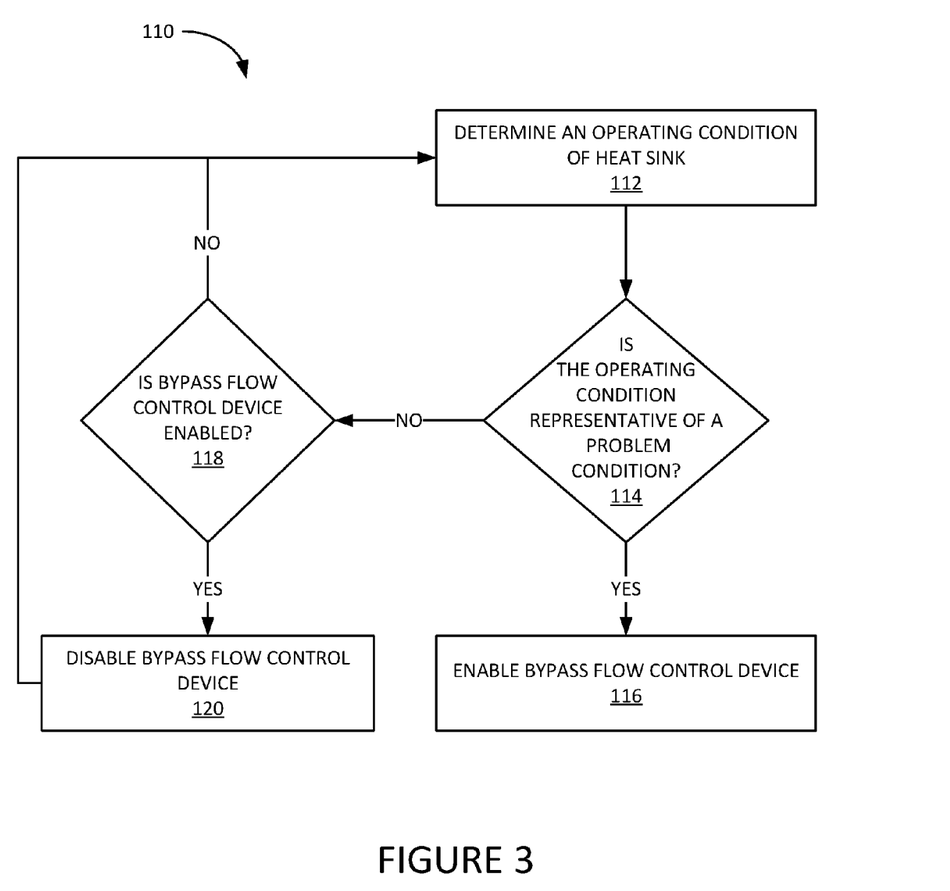
FIG. 3 is a flowchart of a method for controlling a variable frequency drive cooling circuit, according to an embodiment.

FIG. 3 is a flowchart of a method 110 for controlling a variable frequency drive cooling circuit (e.g., the variable frequency drive cooling circuit 100 in FIG. 2), according to an embodiment. The method 110 generally includes determining when additional cooling is necessary for a heat sink (e.g., the heat sink 52 in FIG. 2) for cooling a VFD (e.g., VFD 50 in FIG. 2) such as, for example, when an operating temperature of the VFD and/or the VFD heat sink is higher than an acceptable temperature.

The method 110 begins at 112 when an operating condition of the heat sink 52 is determined by a controller (e.g., the controller 64 in FIG. 2). For example, in an embodiment, the operating condition may be determining a temperature of the heat sink 52 by reading a temperature sensor (e.g., the sensor 58 in FIG. 2 configured as a temperature sensor). In an embodiment, the operating condition may be determining a temperature of the heat sink 52 by reading a pressure sensor (e.g., the sensor 58 in FIG. 2 configured as a pressure sensor to sense a pressure of the working fluid in a heat exchange relationship with the heat sink 52). The pressure determination can be used to identify a temperature of the heat sink 52.

At 114, the controller 64 determines whether the operating condition is representative of a problem condition. For example, if the sensor 58 is a temperature sensor, at 114, the controller 64 can compare the temperature of the heat sink 52 as determined from the sensor 58 at 112 with a heat sink temperature threshold. In an embodiment, the heat sink temperature threshold can be at or about 140° F. It will be appreciated that the heat sink temperature threshold is intended as an example, and that other temperature thresholds are within the scope of this disclosure. The heat sink temperature threshold can be, for example, based on the particular VFD 50 and may, for example, vary based on a manufacturer of the VFD 50.

If the operating condition is representative of a problem condition (e.g., the temperature of the heat sink 52 is greater than or equal to the heat sink temperature threshold) at 114, a bypass flow control device (e.g., the bypass flow control device 60) can be enabled by the controller 64 such that flow of the working fluid at a location of relatively colder working fluid (e.g., from the evaporator 48 in an embodiment) is enabled at 116. After the bypass flow control device 60 is enabled, the method 110 returns to 112.

If the operating condition is not representative of a problem condition (e.g., the temperature of the heat sink 52 is less than the heat sink temperature threshold) at 114, the controller 64 may determine whether the bypass flow control device 60 is currently enabled or disabled at 118. If the bypass flow control device 60 is currently enabled, then the controller 64 disables the bypass flow control device 60. After disabling the bypass flow control device 60 at 120, the method returns to 112. If the flow control device 60 is currently disabled, then the method 110 returns to 112.

In an embodiment, the method 110 may repeat so long as the HVACR system (e.g., the HVACR system 40), and accordingly the VFD 34, is in operation.

Aspects:

Any one of aspects 1-7 can be combined with any one of aspects 8-13, 14-19, 20-23, 24, 25, and/or 26. Any one of aspects 8-13 can be combined with any one of aspects 14-19, 20-23, 24, 25, and/or 26. Any one of aspects 14-19 can be combined with any one of aspects 20-23, 24, 25, and/or 26. Any one of aspects 20-23 can be combined with any one of aspects 24, 25, and/or 26. Aspect 24 can be combined with any one of aspects 25 and/or 26. Aspect 25 can be combined with aspect 26.

Aspect 1. A cooling circuit for a variable frequency drive (VFD) in a heating, ventilation, air conditioning, and refrigeration (HVACR) system, the HVACR system including a condenser, an evaporator, an expansion device, and a compressor fluidly connected, the cooling circuit having a working fluid, the compressor being driven by the VFD, the cooling circuit comprising:

a pump fluidly connected to the condenser and configured to receive the working fluid in liquid form from the condenser;

a bypass flow control device fluidly connected to the pump, the heat sink, and a location in the HVACR system at which the working fluid is at a relatively lower temperature than a temperature of the working fluid in liquid form in the condenser, and the condenser;

a heat sink in a heat exchange relationship with the VFD such that the VFD rejects heat to the working fluid when the HVACR system is in operation;

a sensor and a controller, wherein the controller determines a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled; and a flow control device disposed between the condenser and the component that prevents flow of working fluid from the condenser to the location.

Aspect 2. The cooling circuit according to aspect 1, further comprising a second flow control device disposed between the pump and the heat sink, the second flow control device configured to provide a pressure drop to control a flowrate of the working fluid across the heat sink.

Aspect 3. The cooling circuit according to any one of aspects 1-2, wherein the bypass flow control device is a modulating valve, and includes a flow enabled state, a flow disabled state, and an intermediate state in which flow is enabled at a flowrate that is less than when in the flow enabled state.

Aspect 4. The cooling circuit according to any one of aspects 1-3, wherein the sensor is a temperature sensor.

Aspect 5. The cooling circuit according to any one of aspects 1-3, wherein the sensor is a pressure sensor.

Aspect 6. The cooling circuit according to any one of aspects 1-5, wherein the location is at the evaporator.

Aspect 7. The cooling circuit according to any one of aspects 1-5, the HVACR system including an economizer heat exchanger, wherein the location is at the economizer heat exchanger.

Aspect 8. A heating, ventilation, air conditioning, and refrigeration (HVACR) system, comprising:

a variable frequency drive (VFD);

a condenser, an evaporator, an expansion device, and a compressor fluidly connected, the compressor being driven by the VFD; and a cooling circuit that cools the VFD, the cooling circuit including:

a pump fluidly connected to the condenser and configured to receive a working fluid in liquid form from the condenser;

a bypass flow control device fluidly connected to the pump, the heat sink, and a location in the HVACR system at which the working fluid is at a relatively lower temperature than a temperature of the working fluid in liquid form in the condenser, and the condenser;

a heat sink in a heat exchange relationship with the VFD such that the VFD rejects heat to the working fluid when the HVACR system is in operation;

a sensor and a controller, wherein the controller determines a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled; and a flow control device disposed between the condenser and the component that prevents flow of working fluid from the condenser to the location.

Aspect 9. The HVACR system according to aspect 8, wherein the cooling circuit further comprises a second flow control device disposed between the pump and the heat sink, the second flow control device configured to provide a pressure drop to control a flowrate of the working fluid across the heat sink.

Aspect 10. The HVACR system according to any one of aspects 8-9, wherein the bypass flow control device is a modulating valve, and includes a flow enabled state, a flow disabled state, and an intermediate state in which flow is enabled at a flowrate that is less than when in the flow enabled state.

Aspect 11. The HVACR system according to any one of aspects 8-10, wherein the sensor is a temperature sensor.

Aspect 12. The HVACR system according to any one of aspects 8-10, wherein the sensor is a pressure sensor.

Aspect 13. The HVACR system according to any one of aspects 8-12 wherein the location is at the evaporator.

Aspect 14. A heating, ventilation, air conditioning, and refrigeration (HVACR) system, comprising:
a variable frequency drive (VFD);
a condenser, an evaporator, an expansion device, an economizer heat exchanger, and a compressor fluidly connected, the compressor being driven by the VFD; and
a cooling circuit that cools the VFD, the cooling circuit including:
  a pump fluidly connected to the condenser and configured to receive a working fluid in liquid form from the condenser;
  a bypass flow control device fluidly connected to the pump, the heat sink, and a location in the HVACR system at which the working fluid is at a relatively lower temperature than a temperature of the working fluid in liquid form in the condenser, and the condenser;
  a heat sink in a heat exchange relationship with the VFD such that the VFD rejects heat to the working fluid when the HVACR system is in operation;
  a sensor and a controller, wherein the controller determines a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled; and
  a flow control device disposed between the condenser and the component that prevents flow of working fluid from the condenser to the location.

Aspect 15. The HVACR system according to aspect 14, wherein the cooling circuit further comprises a second flow control device disposed between the pump and the heat sink, the second flow control device configured to provide a pressure drop to control a flowrate of the working fluid across the heat sink.

Aspect 16. The HVACR system according to any one of aspects 14-15, wherein the bypass flow control device is a modulating valve, and includes a flow enabled state, a flow disabled state, and an intermediate state in which flow is enabled at a flowrate that is less than when in the flow enabled state.

Aspect 17. The HVACR system according to any one of aspects 14-16, wherein the sensor is a temperature sensor.

Aspect 18. The HVACR system according to any one of aspects 14-16, wherein the sensor is a pressure sensor.

Aspect 19. The HVACR system according to any one of aspects 14-18, wherein the location is at the economizer heat exchanger.

Aspect 20. A method for controlling a cooling circuit for a variable frequency drive (VFD) in a heating, ventilation, air conditioning, and refrigeration (HVACR) system, the method comprising:
determining, by a controller, an operating condition of a heat sink associated with the VFD;
determining, by the controller, whether the operating condition is representative of a problem condition; and
enabling a bypass flow control device in response to identifying the problem condition.

Aspect 21. The method according to aspect 20, wherein the operating condition is a temperature of the heat sink, and a problem condition includes the temperature of the heat sink being greater than or equal to a heat sink temperature threshold.

Aspect 22. The method according to any one of aspects 20-21, further comprising determining whether the bypass flow control device is enabled in response to identifying the operating condition is not representative of the problem condition.

Aspect 23. The method according to aspect 22, further comprising disabling the bypass flow control device in response to determining that the bypass flow control device is currently enabled.

Aspect 24. A method for retrofitting a cooling circuit into a heating, ventilation, air conditioning, and refrigeration (HVACR) system having a variable frequency drive (VFD) and a heat sink associated therewith, the HVACR system including a compressor, a condenser, an evaporator, an economizer heat exchanger, and an expansion device fluidly connected, the method comprising:
fluidly connecting the condenser with a pump, the heat sink, and a location in the HVACR system at which a working fluid is at a relatively lower temperature than the working fluid in liquid form in the condenser; and
disposing the cooling circuit in a heat exchange relationship with the heat sink.

Aspect 25. A cooling circuit for a variable frequency drive (VFD) in a heating, ventilation, air conditioning, and refrigeration (HVACR) system, the HVACR system including a condenser, an evaporator, an expansion device, and a compressor fluidly connected, the compressor being driven by the VFD, the cooling circuit comprising:
a pump fluidly connected to the condenser and configured to receive a working fluid in liquid form from the condenser;
a bypass flow control device fluidly connected to the pump, the heat sink, the evaporator, and the condenser;
a heat sink in a heat exchange relationship with the VFD such that the VFD rejects heat to the working fluid in the cooling circuit when the HVACR system is in operation;
a sensor and a controller, wherein the controller determines a value representative of an operating condition from the sensor and selectively enables and/or disables the bypass flow control device such that the evaporator fluidly communicates with the heat sink when the bypass flow control device is enabled, and fluid communication between the heat sink and the evaporator is prevented when the bypass flow control device is disabled; and
a flow control device disposed between the condenser and the evaporator that prevents flow of working fluid from the condenser to the evaporator.

Aspect 26. A cooling circuit for a variable frequency drive (VFD) in a heating, ventilation, air conditioning, and refrigeration (HVACR) system, the HVACR system including a condenser, an evaporator, an expansion device, an economizer heat exchanger, and a compressor fluidly connected, the compressor being driven by the VFD, the cooling circuit comprising:

a pump fluidly connected to the condenser and configured to receive a working fluid in liquid form from the condenser;

a bypass flow control device fluidly connected to the pump, the heat sink, the economizer heat exchanger, and the condenser;

a heat sink in a heat exchange relationship with the VFD such that the VFD rejects heat to the working fluid in the cooling circuit when the HVACR system is in operation;

a sensor and a controller, wherein the controller determines a value representative of an operating condition from the sensor and selectively enables and/or disables the bypass flow control device such that the economizer heat exchanger fluidly communicates with the heat sink when the bypass flow control device is enabled, and fluid communication between the heat sink and the economizer heat exchanger is prevented when the bypass flow control device is disabled; and a flow control device disposed between the condenser and the economizer heat exchanger that prevents flow of working fluid from the condenser to the economizer heat exchanger.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A cooling circuit for a variable frequency drive (VFD) in a heating, ventilation, air conditioning, and refrigeration (HVACR) system, the HVACR system including a condenser, an evaporator, an expansion device, and a compressor fluidly connected, the cooling circuit having a working fluid, the compressor being driven by the VFD, the cooling circuit comprising:

a pump fluidly connected to the condenser and configured to receive the working fluid in liquid form from the condenser;

a bypass flow control device fluidly connected to the pump, a heat sink, the condenser, and a location in the HVACR system at which the working fluid is at a relatively lower temperature than a temperature of the working fluid in liquid form in the condenser;

the heat sink being in a heat exchange relationship with the VFD such that the VFD rejects heat to the working fluid when the HVACR system is in operation; and a sensor and a controller, wherein the controller determines a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled.

2. The cooling circuit according to claim 1, wherein the bypass flow control device is a modulating valve, and includes a flow enabled state, a flow disabled state, and an intermediate state in which flow is enabled at a flowrate that is less than when in the flow enabled state.

3. The cooling circuit according to claim 1, wherein the sensor is one of a temperature sensor and a pressure sensor.

4. The cooling circuit according to claim 1, wherein the location is at the evaporator.

5. The cooling circuit according to claim 1, the HVACR system including an economizer heat exchanger, wherein the location is at the economizer heat exchanger.

6. A heating, ventilation, air conditioning, and refrigeration (HVACR) system, comprising:

a variable frequency drive (VFD);

a condenser, an evaporator, an expansion device, and a compressor fluidly connected, the compressor being driven by the VFD; and a cooling circuit that cools the VFD, the cooling circuit including:

a pump fluidly connected to the condenser and configured to receive a working fluid in liquid form from the condenser;

a bypass flow control device fluidly connected to the pump, a heat sink, the condenser, and a location in the HVACR system at which the working fluid is at a relatively lower temperature than a temperature of the working fluid in liquid form in the condenser;

the heat sink being in a heat exchange relationship with the VFD such that the VFD rejects heat to the working fluid when the HVACR system is in operation; and a sensor and a controller, wherein the controller determines a value representative of an operating condition from the sensor and selectively enables and/or disables the bypass flow control device such that the location fluidly communicates with the heat sink when the bypass flow control device is enabled, and fluid communication between the heat sink and the location is prevented when the bypass flow control device is disabled.

7. The HVACR system according to claim 6, wherein the bypass flow control device is a modulating valve, and includes a flow enabled state, a flow disabled state, and an intermediate state in which flow is enabled at a flowrate that is less than when in the flow enabled state.

8. The HVACR system according to claim 6, wherein the sensor is one of a temperature sensor and a pressure sensor.

9. The HVACR system according to claim 6, wherein the location is at the evaporator.

10. The HVACR system according to claim 6, further comprising an economizer heat exchanger.

11. The HVACR system according to claim 10, wherein the bypass flow control device is a modulating valve, and includes a flow enabled state, a flow disabled state, and an intermediate state in which flow is enabled at a flowrate that is less than when in the flow enabled state.

12. The HVACR system according to claim 10, wherein the sensor is one of a temperature sensor and a pressure sensor.

13. The HVACR system according to claim 10, wherein the location is at the economizer heat exchanger.

14. A method for controlling a cooling circuit for a variable frequency drive (VFD) in a heating, ventilation, air conditioning, and refrigeration (HVACR) system, the method comprising:
   identifying, by a controller, an operating condition of a heat sink associated with the VFD;
   determining, by the controller, whether the operating condition is representative of a problem condition;
   enabling a bypass flow control device in response to identifying the problem condition; and
   determining whether the bypass flow control device is enabled in response to identifying the operating condition is not representative of the problem condition.

15. The method according to claim 14, wherein the operating condition is a temperature of the heat sink, and the problem condition includes the temperature of the heat sink being greater than or equal to a heat sink temperature threshold.

16. The method according to claim 14, further comprising disabling the bypass flow control device in response to determining that the bypass flow control device is currently enabled.

\* \* \* \* \*